(12) United States Patent
Subramaniam et al.

(10) Patent No.: US 12,137,414 B2
(45) Date of Patent: Nov. 5, 2024

(54) METHOD AND APPARATUS FOR POWER MANAGEMENT IN A WIRELESS COMMUNICATION SYSTEM

(71) Applicant: Samsung Electronics Co., Ltd., Suwon-si (KR)

(72) Inventors: Karthikeyan Subramaniam, Bangalore (IN); Karthikeyan Narayanan, Bangalore (IN); Naveen Kumar, Bangalore (IN); Veerabhadrappa Murigeppa Gadag, Bangalore (IN); Vivek Soni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 17/484,713

(22) Filed: Sep. 24, 2021

(65) Prior Publication Data

US 2022/0104127 A1    Mar. 31, 2022

Related U.S. Application Data

(63) Continuation of application No. PCT/KR2021/013009, filed on Sep. 24, 2021.

(30) Foreign Application Priority Data

Sep. 25, 2020  (IN) .......................... 202041041616
Sep. 14, 2021  (IN) .......................... 2020 41041616

(51) Int. Cl.
*H04W 52/02* (2009.01)
*H04L 12/26* (2006.01)
(Continued)

(52) U.S. Cl.
CPC ..... *H04W 52/0222* (2013.01); *H04L 43/0894* (2013.01); *H04W 28/0247* (2013.01); *H04W 28/26* (2013.01); *H04W 24/10* (2013.01)

(58) Field of Classification Search
CPC ......... H04W 52/0222; H04W 28/0247; H04W 28/26; H04W 24/10; H04L 43/0894
(Continued)

(56) References Cited

U.S. PATENT DOCUMENTS 9,037,880 B2 *   5/2015   Doddavula ........... G06F 1/3206
                                                         713/300
2003/0115244 A1   6/2003   Molloy et al.
(Continued)

OTHER PUBLICATIONS

International Search Report dated Dec. 29, 2021, issued in International Application No. PCT/KR2021/013009.
(Continued)

*Primary Examiner* — Gbemileke J Onamuti
(74) *Attorney, Agent, or Firm* — Jefferson IP Law, LLP

(57) ABSTRACT

The disclosure is related to a method for power management in a wireless communication system. The method includes measuring network resource utilization levels for a plurality of virtual network functions (VNFs) over a time period based on at least one network parameter, determining a behavioral pattern of the network resource utilization levels based on a predictive analysis of the measured network resource utilization levels, forecasting a lean workload time interval of the network resource utilization levels based on the determined behavioral pattern and current network resource utilization levels of the plurality of VNFs, and adjusting central processing unit (CPU) core frequencies of a network server based on the forecasted lean workload time interval.

20 Claims, 13 Drawing Sheets

(51) Int. Cl.
    *H04L 43/0894*    (2022.01)
    *H04W 28/02*     (2009.01)
    *H04W 28/26*     (2009.01)
    *H04W 24/10*     (2009.01)

(58) Field of Classification Search
    USPC .......................................................... 370/329
    See application file for complete search history.

(56)                References Cited

U.S. PATENT DOCUMENTS

2011/0179132  A1    7/2011   Mayo et al.
    2016/0116954  A1    4/2016   Zhuang et al.
    2018/0210532  A1    7/2018   Zhang et al.
    2018/0225139  A1    8/2018   Hahn et al.
    2018/0246746  A1    8/2018   Miller et al.
    2019/0272002  A1    9/2019   Seenappa et al.
    2019/0278620  A1    9/2019   Korbar et al.
    2021/0081016  A1    3/2021   Hovis et al.

OTHER PUBLICATIONS

Indian Examination Report dated May 20, 2022, issued in Indian Application No. 202041041616.

\* cited by examiner

| 5QI value | Resource type | Default priority level | Packet delay budget | Packet error rate | Default maximum data burst volume (NOTE 2) | Default averaging window | Example services |
|---|---|---|---|---|---|---|---|
| 1 | GBR (NOTE 1) | 20 | 100 ms | $10^{-2}$ | N/A | 2000 ms | Conversational voice |
| 2 | | 40 | 150 ms | $10^{-3}$ | N/A | 2000 ms | Conversational voice (live streaming) |
| 3 | | 30 | 50 ms | $10^{-3}$ | N/A | 2000 ms | Real time gaming, V2X messages electricity distribution-medium voltage, process automation-monitoring |
| 4 | | 50 | 300 ms | $10^{-6}$ | N/A | 2000 ms | Non-conversational video (buffered streaming) |
| 65 | | 7 | 75 ms | $10^{-2}$ | N/A | 2000 ms | Mission critical user plane push to talk voice (e.g., MCPTT) |
| 66 | | 20 | 100 ms | $10^{-2}$ | N/A | 2000 ms | Non-mission-critical user plane push to talk voice |
| 67 | | 15 | 100 ms | $10^{-3}$ | N/A | 2000 ms | Mission critical video user plane |
| 75 | | 25 | 50 ms | $10^{-2}$ | N/A | 2000 ms | V2X messages |

FIG. 5

| QCI | Resource Type | Priority Level | Packet Delay Budget | Packet Error Loss Rate | | | Example Services |
|---|---|---|---|---|---|---|---|
| 5 | Non-GBR (NOTE 1) | 10 | 100 ms | $10^{-6}$ | N/A | N/A | IMS signalling |
| 6 | | 60 | 300 ms | $10^{-6}$ | N/A | N/A | Video (buffered streaming) TCP-based (e.g., www, e-mail, chat, ftp, p2p file sharing, progressive video, etc.) |
| 7 | | 70 | 100 ms | $10^{-3}$ | N/A | N/A | Voice, video (live streaming) interactive gaming |
| 8 | | 80 | 300 ms | $10^{-6}$ | N/A | N/A | Video (buffered streaming) TCP-based (e.g., www, e-mail, chat, ftp, p2p file sharing, progressive video, etc.) |
| 9 | | 90 | | | | | |
| 69 | | 5 | 60 ms | $10^{-6}$ | N/A | N/A | Mission critical delay sensitive signalling (e.g., MC-PTT signalling) |
| 70 | | 55 | 200 ms | $10^{-6}$ | N/A | N/A | Mission critical data (e.g., example services are the same as QCI 6/8/9) |
| 79 | | 65 | 50 ms | $10^{-2}$ | N/A | N/A | V2X messages |
| 80 | | 68 | 10 ms | $10^{-6}$ | N/A | N/A | Low latency eMBB applications augmented reality |

FIG. 6

METHOD AND APPARATUS FOR POWER MANAGEMENT IN A WIRELESS COMMUNICATION SYSTEM

CROSS-REFERENCE TO RELATED APPLICATION(S)

This application is a continuation application, claiming priority under § 365(c), of an International application No. PCT/KR2021/013009, filed on Sep. 24, 2021, which was based on and claimed the benefit of an Indian Provisional patent application Serial number 202041041616, filed on Sep. 25, 2020, in the Indian Intellectual Property Office and of an Indian Complete patent application Serial number 202041041616, filed on Sep. 14, 2021, in the Indian Intellectual Property Office, the disclosure of each of which is incorporated by reference herein in its entirety.

BACKGROUND

1. Field

The disclosure relates to a method and system for power management in a wireless communication system. More particularly, the disclosure relates to a dynamic frequency control method and system for artificial intelligence-based distributed allocation of bearer sessions across user plane components to facilitate a power saving mode in a telecom data center.

2. Description of Related Art

With most of the cloud operators adopting Virtualization, the various components of virtual gateway (vGW) are deployed as virtual network functions (VNFs). The 5G NR introduces a concept of 5G centralized unit controlled part (CU CP) and 5G centralized unit user part (CU UP) separation. Typically, the 5G radio access network (RAN) node system consists of virtualized RAN Node-CU installed in the market data center (MDC) or edge data center RAN node-CU as a VNF that processes radio resource control (RRC) and packet data convergence protocol (PDCP) functions. It improves the scalability of the system using the network function virtualization (NFV) platform-based virtualization technology and provides ease of operation by installing it in a data center. The CU-CP and CU-UP can be implemented as each VNFs and can be grown independently according to traffic volume. The virtual user-facing provider edge (vUPE) handles the traffic processing from the user side and assigns cores to various other modules in CU-UP. The virtualized system manager (VSM) provides management functions for operating and maintaining RAN Node-CU and RAN Node-Distributed Unit (DU).

In addition, the value stream modeler (VSM) provides a northbound API for operations support system (OSS) interoperation. The Northbound API is an interface between an application Server (either in a telecom operator's network or external to it) and higher-level components in the telecom operator's network via specified Functions. The VSM interworks with the management and orchestration (MANO) architecture-based virtualized network function manager (VNFM) which takes care of the life cycle management of the VNFs. In order to reduce latency in vUPE, fast path packet processing has been enabled and the central processing unit (CPU) cores pinned to each VNF that operates at high frequency.

However, the network traffic at the Data Centers has an off-peak time of 5 hours/day on average. The CPU frequency remains high even during these off-peak times i.e., lean CPU usage time. Thus, there is an excess of power utilization of the system during the off-peak hours which should be reduced.

FIG. 1 illustrates an illustration of central processing unit (CPU) resource usage without dynamic frequency control, according to the related art.

Referring to FIG. 1, the CPU frequency remains high even during off-peak times. It is evident from FIG. 1 that operational frequencies of the CPU are high during the off-peak times. Due to the high operational frequency, the CPU is utilizing excessive power even during the off-peak times.

Therefore, there lies a need for a method and system that can address the issue related to power utilization of the system significantly during the off-peak hours. Accordingly, the disclosure describes a solution to the issue regarding excess power utilization of the system during the off-peak hours. The disclosure describes a method and system to manage the power utilization of the system during the off-peak hours by controlling the operational frequency of the CPU dynamically control such that excess power utilization by the system during off-peak hours can be reduced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for power management in a wireless communication system.

Additional aspects will be set forth in part in the description which follows and, in part, will be apparent from the description, or may be learned by practice of the presented embodiments.

In accordance with an aspect of the disclosure, a power management method in a wireless communication system is provided. The method includes measuring network resource utilization levels of a plurality of (virtualized network functions) VNFs over a time period based on at least one network parameter. The method further includes determining a behavioral pattern of the network resource utilization levels based on a predictive analysis of the measured network resource utilization levels and forecasting a lean workload time interval of the network resource utilization levels based on the determined behavioral pattern and current network resource utilization levels of the plurality of VNFs. The method furthermore includes adjusting CPU core frequencies of a network server based on the forecasted lean workload time interval.

In accordance with another aspect of the disclosure, an apparatus for power management in a wireless communication system is provided. The apparatus includes a transceiver, a memory, and at least one processor coupled to the transceiver and the memory. The at least one processor is configured to measure network resource utilization levels for a plurality of virtual network functions (VNFs) over a time period based on at least one network parameter from a plurality of network parameters; determine a behavioral pattern of the network resource utilization levels based on a predictive analysis of the measured network resource utilization levels; forecast a lean workload time interval of the network resource utilization levels based on the determined behavioral pattern and current network resource utilization levels of the plurality of VNFs, and adjust CPU core frequencies of a network server based on the forecasted lean workload time interval.

According to an implementation, the disclosure relates to the prediction of a lean time interval of CPU utilization of the CU-UP and thereby reduction of the CPU frequency using vUPE data plane development kit (DPDK) application. The method disclosed in the disclosure enables power saving mode for the CU-UP, which will forecast the lean CPU utilization time interval and reduce the CPU frequency, and reassigning the cores for the VNF. This in turn helps to reduce the power utilization of the system, significantly, during the off-peak hours.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other features, aspects, and advantages of certain embodiments of the disclosure will be more apparent from the following description taken in conjunction with the accompanying drawings, in which:

FIGS. 5 and 6 illustrate a representation of standardized 5$^{th}$ generation (5G) quality of service (QoS) identifier (5QI) values and corresponding parameters included in network traffic data, according to various embodiments of the disclosure;

The same reference numerals are used to represent the same elements throughout the drawings.

DETAILED DESCRIPTION

Figure 1:
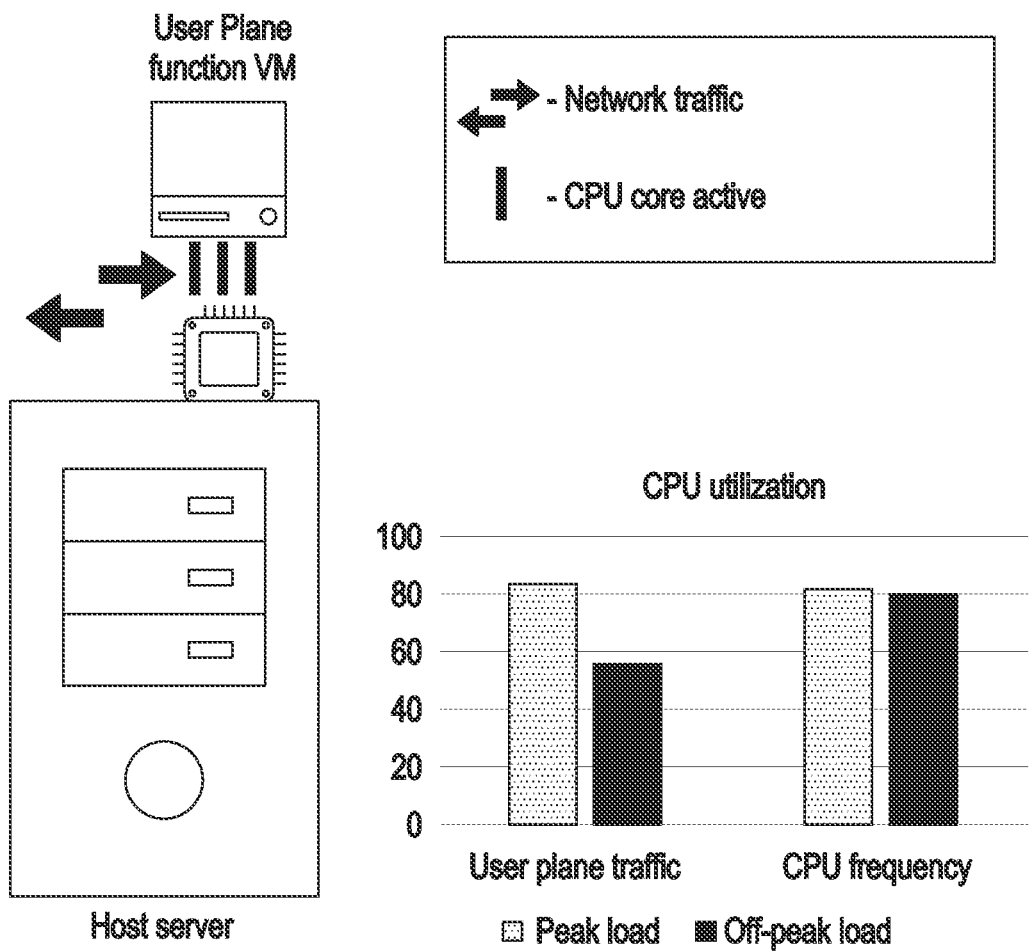
FIG. 1 illustrates an illustration of central processing unit (CPU) resource usage without dynamic frequency control, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It should be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict, or reduce the spirit and scope of the claims or their equivalents.

More specifically, any terms used herein, such as but not limited to "includes," "comprises," "has," "consists," and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element unless otherwise specified by limiting language, such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the disclosure will be described below with reference to the accompanying drawings.

Figure 2:
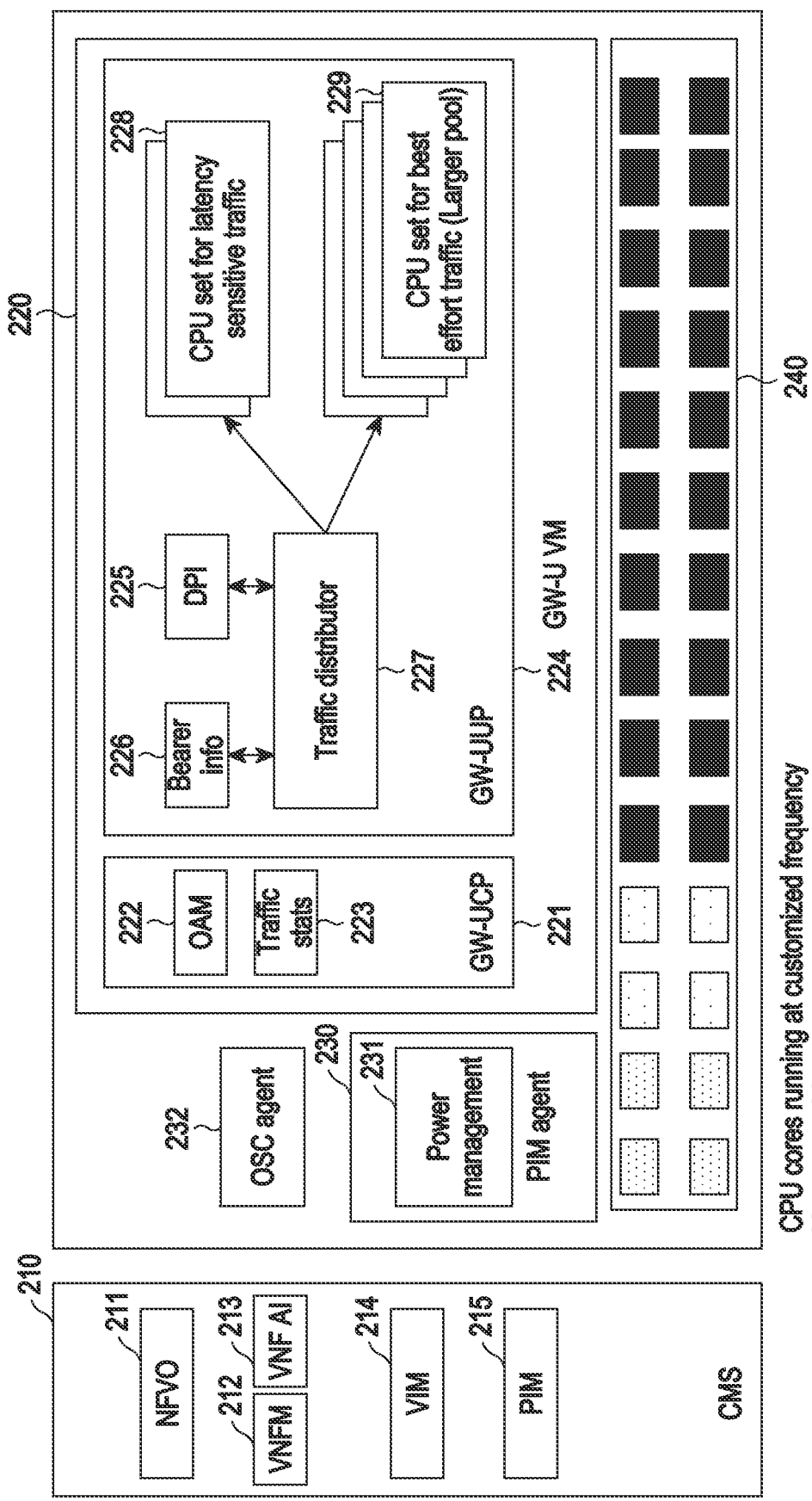
FIG. 2 illustrates a block diagram of a system for power management with dynamic frequency control, according to an embodiment of the disclosure.

FIG. 2 illustrates a system architecture for dynamic frequency control according to an embodiment of the disclosure.

Referring to FIG. 2, the system 200 includes interaction of various units, such as content management system (CMS) 210, gateway user plane virtual machine (GW-U VM) 220, physical infrastructure monitor (PIM) agent 230, openstack controller (OSC) agent 232, and CPU cores 240. In an embodiment of the disclosure, GW-U VM 220 may further comprise gateway user plane control part (GW-U CP) 221 and gateway user plane user part (GW-U UP) 224. In an embodiment of the disclosure, the CMS may comprise network functions virtualization orchestrator (NFVO) 211, virtual network functions manager (VNFM) 212, virtual network function-artificial intelligence (VNF-AI) module 213, virtual infrastructure manager (VIM) module 214, and a protocol-independent multicast (PIM) module 215. In an embodiment of the disclosure, the PIM agent 230 may comprise power management module 231. In an embodiment of the disclosure, GW-U CP 221 may further comprise operations administration and management (OAM) module 222 and traffic stats module 223. In an embodiment of the disclosure, GW-U UP 224 may comprise deep packet inspection (DPI) module 225, a bearer info module 226, and a traffic distributor module 227. In an embodiment of the disclosure, the traffic distributor is in communication with a CPU set 228 for latency-sensitive traffic and a CPU set 229 for best-effort traffic.

The CMS 210 hosts and manages telecom applications in a cloud-based telecom network. The NFVO 211 coordinates resources and networks needed to set up cloud-based services and applications in the telecom network. The NFVO 211 may also coordinate with many network and software elements, including inventory systems, billing systems, provisioning tools, and operating support systems (OSSs). The NFVO 211 may also govern VNF Managers, virtualized infrastructure managers in the NFV MANO module, and virtualization layers of the network functions virtualization infrastructure (NFVI).

The VNFM 212 is a key component of the NFV MANO architectural framework. The VNFM 212 is responsible for life cycle management of VNF functions.

The VNF-AI module 213 includes a VNF-AI interface to forecast AI-user plane collection from individual VNFs. The VNFM 212 enables the VNF-AI interface to forecast the AI-user plane collection. The VNF-AI module 213 predicts the lean workload period of the CPU cores 240 (to be described below) using an auto-regressive integrated moving average (ARIMA) time series model. The ARIMA time series model is a statistical analysis model that uses time series data set to predict future trends or patterns corresponding to CPU frequencies of the CPU cores 240. For example, the VNF-AI module 213 forecasts CPU frequencies of the CPU cores 240 required to process the traffic based on factors like packet size, packets, throughput, or the like. As an example, the ARIMA time series model uses guaranteed bit rate (GBR) and Non-GBR traffic data set with a timestamp to indicate the time when the GBR and the Non-GBR traffic flows in the 5G Network.

The VIM module 214 controls and manages the NFVI and network resources. The VIM module 214 is a specific part of the MANO framework but can have multiple instances in the telecom network. The VIM module 214 may also manage a repository of the NFVI hardware resources (compute, storage, networking) and software resources (hypervisors).

The PIM module 215 provides multicast routing protocols for Internet Protocol (IP) networks for the distribution of data across the telecom network wirelessly.

The GW-U VM 220 corresponds to a virtual machine that performs set of functions related to Gateway User Plane functions.

The GW-U CP 221 is in charge of the control functions, including authentication, authorization, and accounting (AAA) management function, IP address management function, user management function, access protocol processing function, and user plane management function, or the like. The GW-U CP 221 is implemented using virtualization technologies and is deployed in the mode of centralization.

The OAM module 222 performs operations associated with administration and management in telecom system. The Operations associated with the administration and the management corresponds to processes, activities, tools, and standards involved with operating, administering, managing and maintaining the telecom system.

The GW-U UP 224 provides user packets switching under the instruction of the GW-U CP 221. The GW-U UP 224 is implemented in different types of forwarding hardware, but not limited to, NP-based dedicated equipment, ASIC-based dedicated equipment, or X86-based commercial equipment.

The Traffic stats module 223 is responsible for managing the traffic associated with the GBR and the Non-GBR traffic data. The traffic distributor module 227 is communicatively coupled with the DPI module 225 and the bearer info module 226.

The DPI module 225 identifies and classifies the network traffic and collects real-time traffic data from multiple network points to deliver insights that can be used as inputs for the network and application-level decision making.

The bearer info module 226 includes information regarding a group of bearers stored in a record or a database for AI/ML Processing using the ARIMA time series model to forecast network traffic trends. The bearer info module 226 may also include information regarding a path or sessions used by the user traffic during the passing of an LTE transport network between a user equipment (UE) and packet data network gateway (PDN-GW). The user traffic is categorized as the GBR traffic or the non-GBR traffic. For the GBR traffic, the UE is guaranteed a set bit rate for the bearer. Mostly delay-sensitive traffic falls under the GBR category. In the case of the non-GBR traffic, a default bearer is always a non-GBR bearer, with best-effort data rates. Mostly delay-tolerant traffic falls under the non-GBR category.

The traffic distributor module 227 manages the CPU set 228 for latency-sensitive traffic and the CPU set 229 for best-effort traffic in accordance with the 5G network traffic. The 5G network traffic is categorized into the GBR and the Non-GBR. Accordingly, the VNF-AI module 213 uses the ARIMA time series model with a timestamp associated with the 5G network traffic to forecast future network traffic based on historical network traffic data stored in a shared memory of the system 200.

The power management module 231 is configured to optimize the power of a data center hosting telecom applications. More particularly, the power management module 231 manages core frequencies of the core running applications (i.e., telecom functions depending up on varying traffic conditions).

The OSC agent 232 can collect and manage performance and fault information from physical servers of system 200. The OSC agent 232 corresponds to a controller node. The controller node is a system where most of the OpenStack services are installed. The term controller node is used to discuss nodes that do not run virtual machine instances. The controller nodes may be configured to provide non-computing based services or only some of them.

The CPU cores 240 are example cores of CPUs in the telecom data center. In an example, the CPU cores 240 are running at a customized frequency. According to an embodiment of the disclosure, the VNF-AI module 213 predicts a lean workload time period of the CPU cores 240 using the ARIMA time series model. The lean workload time period is a time duration during which utilization of a resource in a VNF is sub-optimal, for example, 50-60% of CPU utilization in the telecom data center during off-peak hours.

Figure 3:
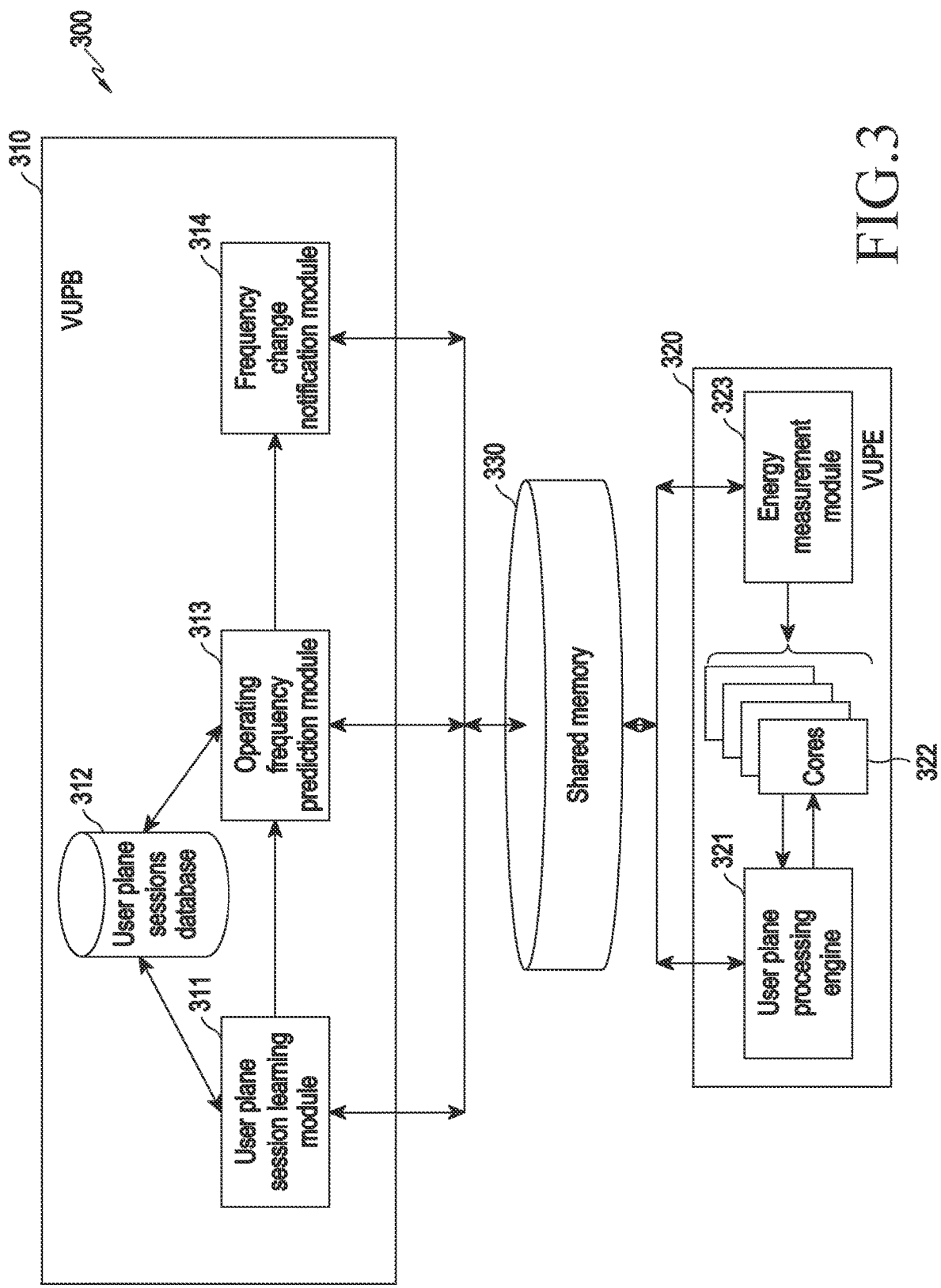
FIG. 3 illustrates an implementation of an AI-assisted user plane allocation (AIA-UPA) system architecture for power management with dynamic frequency Control, according to an embodiment of the disclosure.

FIG. 3 illustrates an implementation of an AI-assisted user plane allocation (AIA-UPA) system architecture for power management with dynamic frequency Control, according to an embodiment of the disclosure.

Referring to FIG. 3, it illustrates an implementation of AI-assisted user plane allocation (AIA-UPA) system architecture for power management with dynamic frequency Control, according to an embodiment of the disclosure. Referring to FIG. 3, it illustrates a system 300 that includes a virtual user plane block (VUPB) 310, a virtual user plane engine (VUPE) 320, and a shared memory 330.

The VUPB 310 is a virtual user plane management engine hosted in the VSM and is responsible for the management of the VUPE 320. The VUPE 320 is a virtual user plane processing engine hosted in the VSM. The VUPE 320 processes bearer sessions or user plane session Traffic. The shared memory is associated with a network server and provides a shared interface between the VUPB 310 and the VUPE 320.

The VUPB 310 includes a user plane session learning module 311, a user plane sessions database 312, operating frequency prediction module 313, a frequency change notification module 314. The VUPE 320 includes user plane processing engine 321, CPU cores 322, and an Energy Measurement Module 323.

The VUPE 320 receives network traffic data at the CPU cores 322. The VUPE 320 updates the shared memory each time when the network traffic data is received at the CPU cores 322. As an example, the VUPE 320 collects data packets associated with user plane data radio bearers (DRB) sessions including a time stamp, wherein each of the data packets includes information associated with one of quality-of-service class identifiers (QCI) values or quality-of-service flow ID (QFI) values, a packet delay budget of a user plane network traffic, a throughput of the user plane network traffic, a flow priority level, and a latency of the user plane network traffic. The VUPE 320 stores the collected data packets in the shared memory. The collected data packets include information regarding standardized 5QI values that are specified in standards for the services that are assumed to be frequently in accordance with standardized quality of service (QoS) characteristics. Information corresponding to each service that is included in the collected data packets has predefined QFI values or QCI values. The user plane DRB sessions can also be referred as "GBR flows or the non-GBR flows" without deviating from the scope of the invention.

Figure 4:
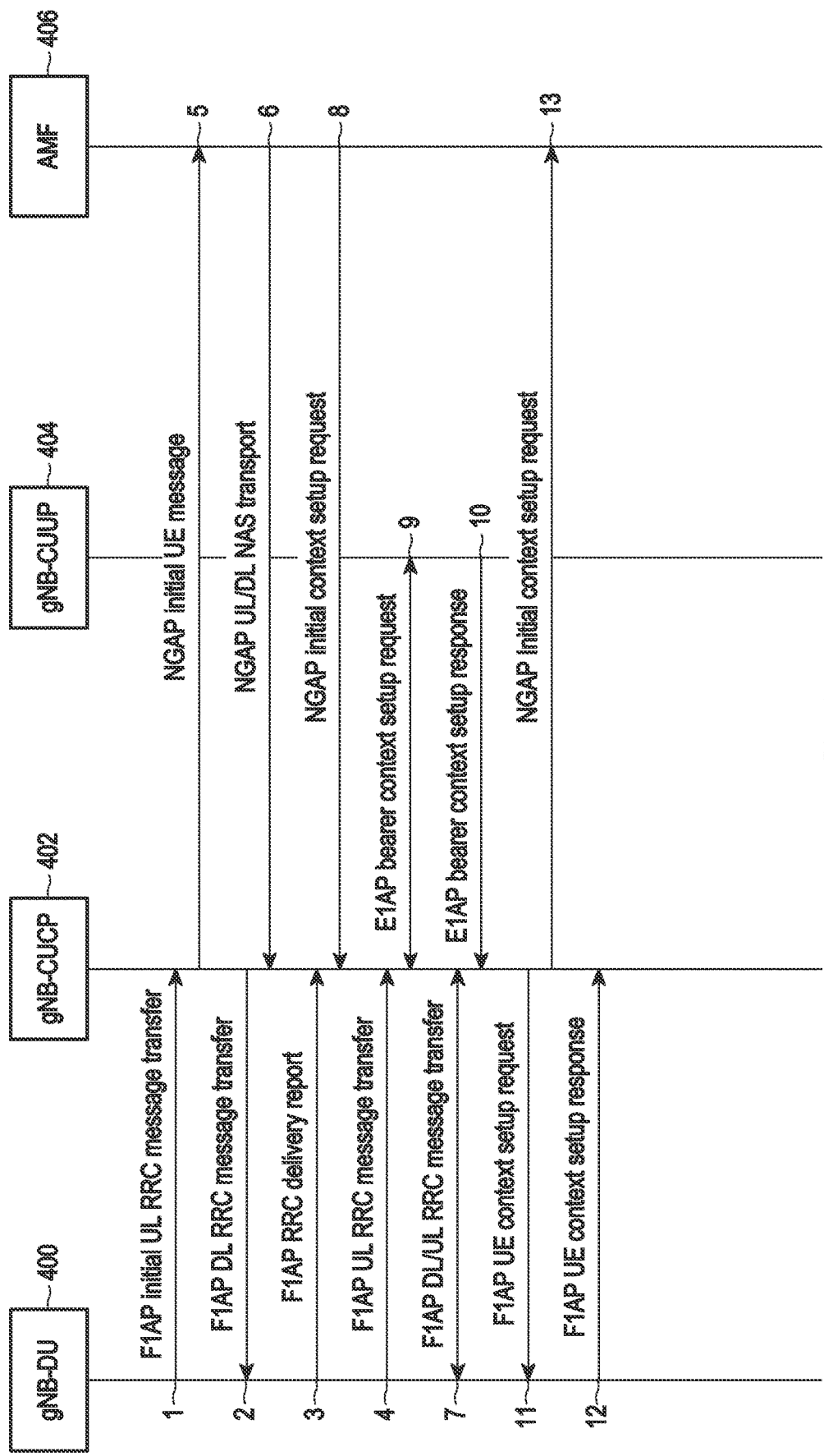
FIG. 4 illustrates line diagram for bearer context setup message flow corresponding to guaranteed bit rate (GBR) and Non-GBR flows, according to an embodiment of the disclosure.

Referring to FIG. 4, an example of bearer context setup message flow corresponding to GBR and Non-GBR flows will be described.

FIG. 4 illustrates a line diagram for bearer context setup message flow corresponding to GBR and Non-GBR flows according to an embodiment of the disclosure.

Referring to FIG. 4, the bearer context setup message flow includes multiple stages of the transfer of the RRC message using F1 application protocol (F1AP), next generation application protocol (NGAP), and E1 application protocol (E1AP). In an embodiment of the disclosure, the F1AP Initial UL RRC message transfer request may be transmitted from gNB Distributed Unit (gNB-DU) 400 to gNB-CU-control plane (gNB-CUCP) 402. Further, the F1AP DL RRC message transfer message may be transmitted from the gNB-CUCP 402 to the gNB-DU 400. Further, F1AP RRC delivery report may be transmitted from the gNB-DU 400 to gNB-CUCP 402. Furthermore, F1AP UL RRC Message Transfer may be sent from the gNB-DU 400 to gNB-CUCP 402.

Further, the gNB-CUCP 402 may transmit NGAP Initial UE Message to access and mobility management function (AMF) 406. The AMF 406 receives all connection & session-related information that enables the creation of bearer sessions from the UE. Further, in an embodiment of the disclosure, NGAP UL/DL Non-Access Stratum (NGAP UL/DL NAS) Transport communication may happen between the AMF 406 and the gNB-CUCP 402. Further, in an embodiment of the disclosure, F1AP DL/UL RRC Message Transfer communication may happen between the gNB-DU 400 and the gNB-CUCP 402. Furthermore, NGAP initial context setup request may be transmitted from the AMF 406 to the gNB-CUCP 402.

Now with reference to the E1 interface, E1AP bearer context setup request may be transmitted from the gNB-CUCP 402 to gNB-CU-user plane (gNB-CUUP) 404. Further, E1AP bearer context setup response may be transmitted from the gNB-CUUP 404 to the gNB-CUCP 402. Furthermore, the F1AP UE context setup request message may be transmitted from the gNB-CUCP 402 to the gNB-DU 400. Furthermore, F1AP UE context setup response may be sent from the gNB-DU 400 to the gNB-CUCP 402, and in the final step, the gNB-CUCP 402 further transmits NGAP initial context setup request to the AMF 406. Accordingly, the bearer context setup message flow for bearer setup is completed based on the multiple stages of message transfer via the F1AP, the NGAP, and the E1AP.

Now an example of information included in the data packets will be described with reference to FIGS. 5 and 6.

FIGS. 5 and 6 illustrate a representation of standardized 5G QoS identifier (5QI) values and corresponding parameters included in network traffic data according to various embodiments of the disclosure.

Referring to FIGS. 5 and 6, they illustrate parameters corresponding to the services included in the collected data packets. The parameters include a resource type of the service, default priority level, packet delay budget, packet error rate, default maximum data burst volume, and default averaging window. These parameters indicate a throughput, a flow priority level, and latency information included in the data packets. The resource type of the service indicates one of the GBR flows or the non-GBR flows. In a 5G communication network, the packet delay budget defines an upper bound for the time that a packet may be delayed between the UE and the user plane function (UPF). In a 4G communication network, the packet delay budget defines an upper limit of the delay suffered by a packet between the UE and the Policy and charging enforcement function (PCEF).

Each time a new data packet is collected by the VUPE 320, the shared memory 330 is updated to store the new data packet. The shared memory 330 collects CPU frequency and core allocation information regarding the CPU cores 322 from the VUPB 310.

The VUPB 310 measures network resource utilization levels of the VNFs over a time period based on at least one network parameter from a plurality of network parameters. The plurality of network parameters corresponds to at least one of a specific time of a day, a density of the network traffic, and a specific weather condition, or the like . . . . As an example, the user plane session learning module 311 measures the network resource utilization levels of the VNFs over the time period based on the information of the data packet stored in the shared memory 330. The measured network resource utilization levels may include information related to at least one of a central processing unit (CPU) core utilization level corresponding to the CPU cores 322, inter-arrival of the data packets, sizes of the data packets, a type of user plane network traffic, the QCI values associated with the data packets, and the QFI values associated with the data packets.

After measuring the network resource utilization levels of the VNFs, the VUPB 310 stores the measured network resource utilization levels as historical data in the user plane sessions database 312. As an example, the user plane session learning module 311 stores the measured network resource utilization levels as the historical data in the user plane sessions database 312.

The VUPB 310 further determines a behavioral pattern of the network resource utilization levels based on a predictive analysis of the measured network resource utilization levels stored in the user plane sessions database 312. As an example, the user plane session learning module 311 analyses the measured network resource utilization levels stored in the user plane sessions database 312 using the ARIMA time series model and determines the behavioral pattern of the network resource utilization levels based on a result of the analysis.

For the determination of the behavioral pattern of the network resource utilization levels, the VUPB 310 determines priority levels of the data packets based on a class of at least one of the QCI values and the QFI values included in the data packets and determines a level of the network traffic based on the information associated with the packet delay budget, the throughput, the flow priority level, and the latency included in the data packets. Thereafter, the VUPB 310 trains the ARIMA time series model based on the determined priority level, the historical data, and the determined level of the network traffic.

Now, an explanation regarding the determination of the priority levels of the data packets and the determination of the behavioral pattern of the network resource utilization levels will be made with reference to FIG. 7.

For the determination of the priority levels of the data packets, the user plane session learning module 311 in combination with the operating frequency prediction module 313 decides weights for the incoming data packets using a machine learning (ML) algorithm in accordance with the associated priority of a QoS flow of the data packets indicating QCI values and the QFI values. The weights for the incoming data packets are decided based on the past data using the ML algorithm. The 5QI values of the incoming data packets are used by the ML algorithm to decide the weights and can be given as:

$$Y_i = x_i t_i + v_i b_i + w_i p_i, \text{ where,}$$

Yi denotes the priority of a QoS flow I, and $x_i$, $v_i$, and $w_i$ denotes the weights assigned to packet delay budget $t_i$, flow bit rate $b_i$, and flow priority level $p_i$, respectively.

Here, the value of Yi is scaled in a range of [0,1]. A value closer to 1 indicates a higher priority level of the data packet and a value closer to 0 indicates a lower priority level of the data packet. If a priority value ($Y_i$) of the QoS flow i is between 0.7 and 1, then it is determined that there is a requirement of CPU cores to be run at a high frequency level. Further, if the priority value $Y_i$ of the QoS flow i is between 0.3 and 0.7, then it is determined that there is a requirement of the CPU cores to be run at a medium frequency level. Furthermore, if the priority value $Y_i$ of the QoS flow i is between 0 and 0.3, then it is determined that there is a requirement of the CPU cores to be run at a lower frequency level. The $Y_i$ value generally varies based on the type of flow identified as per the QCI and the QFI values. As an example, a ratio of the number of flows in each of the above-mentioned three classes can be denoted as m:n:o and the available CPU cores of the network sever will run in the same ratio. Further, as an example, using the weight assigned to the PDB in 5QI the classes of the CPU cores can be identified. For example, if the PDB has a value in a range of 0-100 ms, it can be determined that there is a requirement of cores to be run at the high frequency level. The services like, but are not limited to, conversational voice services, real-time gaming services, V2X communication services, or the like . . . require higher throughput and thus the CPU cores are required to run at the high frequency level while processing such services. In a further example, if the PDB has a value in a range of 101-300 ms, it can be determined that there is the requirement of cores to be run at the medium frequency level. The services like, but not limited to, buffered streaming, live streaming, or the like . . . are considered as medium priority services and the CPU cores are required to run at the medium frequency level while processing such services. In a further example, if the PDB has a value in a range of 301-500 ms, it can be determined that there is the requirement of cores to be run at the lower frequency level. The services like, but not limited to, IMS Signalling Services may require a lower throughput and thus CPU cores to be run at the lower frequency level.

Further, for the determination of the behavioral pattern of the network resource utilization levels, the user plane session learning module 311 in combination with the operating frequency prediction module 313 monitor the 5QI flows over a period of time to determine the number of cores required to operate in one of the high frequency level, the medium frequency level, and the low frequency, and keeps training the ARIMA time series model based on the determined priority level with reference to the historical traffic data and current network traffic data. Thus, the user plane session learning module 311 determines the behavioral pattern of the network resource utilization levels based on the monitoring of the 5QI flows over the period of time using the trained ARIMA time series model.

Figure 7:
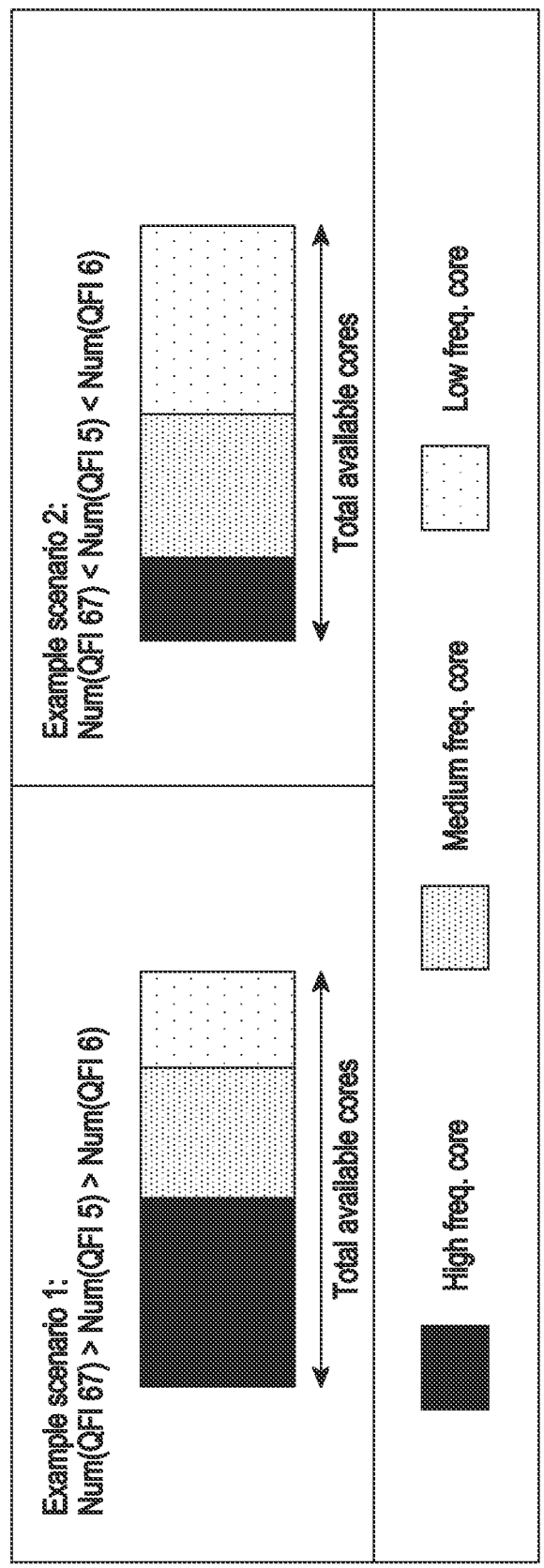
FIG. 7 illustrates a scenario of determining a behavioral pattern of network resource utilization levels using 5QI flows, according to an embodiment of the disclosure.

FIG. 7 illustrates a scenario of determining a behavioral pattern of a network resource utilization levels according to an embodiment of the disclosure.

Referring to FIG. 7, it depicts two example scenarios namely Example scenario 1 and Example scenario 2. Each of Example scenario 1 and Example scenario 2 illustrates a number class (QFI 67, QFI 5, and QFI 6) of 5QI flows belonging to the GBR traffic or the non-GBR traffic, respectively. Here, the QFI Type 67 indicates the GBR Traffic and corresponds to "Mission Critical Video User Plane Traffic", and this service needs a default averaging window of 2000 ms owing to mission-critical. Thus, requires CPU cores to be operated at high frequency. Further, QFI Type 6 indicates the Non-GBR Traffic and corresponds to services that can be operated on medium-frequency CPU cores. Furthermore, the QFI Type 5 indicates the Non-GBR Traffic and corresponds to services that can be operated on lower frequency CPU cores. Accordingly, based on the classification of the services and associated time of availing these services is closely monitored and the behavior pattern of service utilization level is determined based on such monitoring. Accordingly, the total available cores of the network server can be divided into different classes as high frequency cores, medium frequency cores, and low-frequency cores based on the determined behavior pattern.

After the determination of the behavioral pattern, the VUPB 310 forecasts a lean workload time interval of the network resource utilization levels based on the determined behavioral pattern and current network resource utilization levels of the plurality of VNFs. As an example, the user plane session learning module 311 forecasts the lean workload time interval of the CPU cores 322 based on the determined behavioral pattern and current CPU core utilization levels of the CPU cores 322. The CPU core utilization level indicates a frequency level among a plurality of frequency levels associated with the CPU cores 322. The user plane session learning module 311 may further forecast the lean workload time interval using the ARIMA time series model when the usage of the CPU cores 322 reaches a point that is less than a threshold usage limit for the CPU cores 322. The ARIMA time series model provides the best results in terms of accuracy and mean average percentage error (MAPE) for predicting the lean workload time interval. Accordingly, the VNFM 212 utilizes the predicted lean workload time interval to alter the CPU frequency based on the need of the hour.

According to an embodiment of the disclosure, the user plane session learning module 311 manages a processing flow of the data packets based on the determined priority levels of the data packets. Further, based on the processing flow of the data packets, the user plane session learning module 311 determines the behavioral pattern of the network resource utilization levels and forecasts the lean workload time interval.

The forecasted lean workload time interval indicates an off-peak time interval at which the network resource utilization levels are less than a specific optimal resource utilization threshold value of the plurality of VNFs. Here, the off-peak time interval means a time interval at which CPU cores utilization level of the network server (i.e., a CPU core utilization level corresponding to the CPU cores 322) is less in comparison to a peak time interval.

After forecasting the lean workload time interval, the VUPE 320 adjusts CPU core frequencies of the network server based on the forecasted lean workload time interval. As an example, typically, user plane cores generally run at a peak frequency in a data center and hence consume more power, thus considered in a peak power mode. The server which has cores running on peak frequency draws more power and the adjustment of the CPU core frequencies is performed to manage the core frequencies that do not need peak frequency to operate in the forecasted lean workload time interval. As an example, the VUPE 320 adjusts the core frequencies of the CPU cores 322 such that the CPU cores 322 starts operating in a power saving mode from the peak power mode. The adjustment of core frequencies of the CPU cores 322 indicates a change in the core frequencies of the CPU cores 322 from a first frequency level of the plurality of frequency levels to one of a second frequency level of the plurality of frequency levels or a third frequency level of the plurality of frequency levels. The adjustment of the core frequencies of the CPU cores 322 corresponds to a scaling of the core frequencies of the CPU cores 322, and the scaling of the core frequencies is performed by toggling the frequency of the CPU cores in the network server having one of medium network resource utilization levels or low network resource utilization levels.

For the adjustment of the core frequencies of the CPU cores 322, firstly the user plane session learning module 311 allocates core numbers along with a corresponding operating frequency level of the plurality of frequency levels to the operating frequency prediction module 313. Secondly, the operating frequency prediction module 313 determines whether the data packets have high priority levels and whether there is a requirement of high throughput of user plane DRB sessions at a specific time interval "t" based on the corresponding parameters included in the network traffic data, such as the throughput, the Default Averaging Window, the Packet delay budget, and the flow priority level, and the latency information. Further, the operating frequency prediction module 313 determines the operational frequency for a set of cores among the CPU cores 322 having a medium and a low frequency utilization level with Core IDs at the specific time interval based on a result of the determination of whether the data packets have high priority levels and whether there is a requirement of high throughput of user plane DRB sessions. Furthermore, the operating frequency prediction module 313 transfers the determined operational frequency for the set of cores having the medium and the low frequency utilization level to the user plane processing engine 321 of the VUPE 320 via the shared memory 330. Thirdly, the user plane processing engine 321 changes the operational frequency of the CPU cores 322 based on the operational frequency determined by the operating frequency prediction module 313. Thereafter, the CPU cores 322 start operating in the power saving mode from the peak power mode.

More particularly, the User Plane Processing Engine 321 changes the operational frequency of the CPU cores 322 from a high frequency level to one of a medium frequency level or a low frequency level. A high frequency utilization level of the CPU cores 322 indicates a high frequency level and operates in peak power mode, whereas the CPU cores 322 having the medium or the low frequency utilization level indicates one of the medium frequency level or the low frequency level and operates in the power saving mode.

According to an embodiment of the disclosure, in a case, if it is determined by the operating frequency prediction module 313 that the incoming data packets have high priority levels and also there is a requirement of high throughput of the user plane DRB sessions then in such condition, the user plane processing Engine 321 can switch the CPU core frequencies from one of the medium frequency level or the low frequency level to the high frequency level such that the network server enters back again into the peak power mode from the power saving mode.

After the adjustment of the core frequencies of the CPU cores 322, the VUPE 320 optimizes the CPU cores of the network server based on the adjusted CPU core frequencies such that power consumption of the network server is reduced while maintaining an optimal data traffic rate. As an example, the user plane processing Engine 321 optimizes the CPU cores 322 based on the adjusted core frequencies of the CPU cores 322.

For the optimization of the CPU cores, firstly the VUPB 310 classifies a plurality of sets of CPU cores of the network server based on a current data traffic rate of the network traffic and the adjusted CPU core frequencies. More particularly, as an example, the operating frequency prediction module 313 classifies one or more sets of the CPU cores 322 based on the current data traffic rate and the adjusted CPU core frequencies. Secondly, based on the classified plurality of sets of the CPU cores, the user plane processing engine 321 of the VUPE 320 allocates the high frequency to a first set of CPU cores among CPU cores 322 having the high CPU core utilization level, the medium frequency to a second set of CPU cores among the CPU cores 322 having the medium CPU core utilization level, and the low frequency to a third set of CPU cores having the low CPU core utilization level, respectively.

Now, a description will be made with the help of FIGS. 8 and 9 to depict outcomes of the adjustment of the core frequencies and the optimization of the CPU cores 322 with an example scenario in the context of the Bearer Context Setup Message Flow corresponding to the GBR and Non-GBR flows of FIG. 4.

Figure 8:
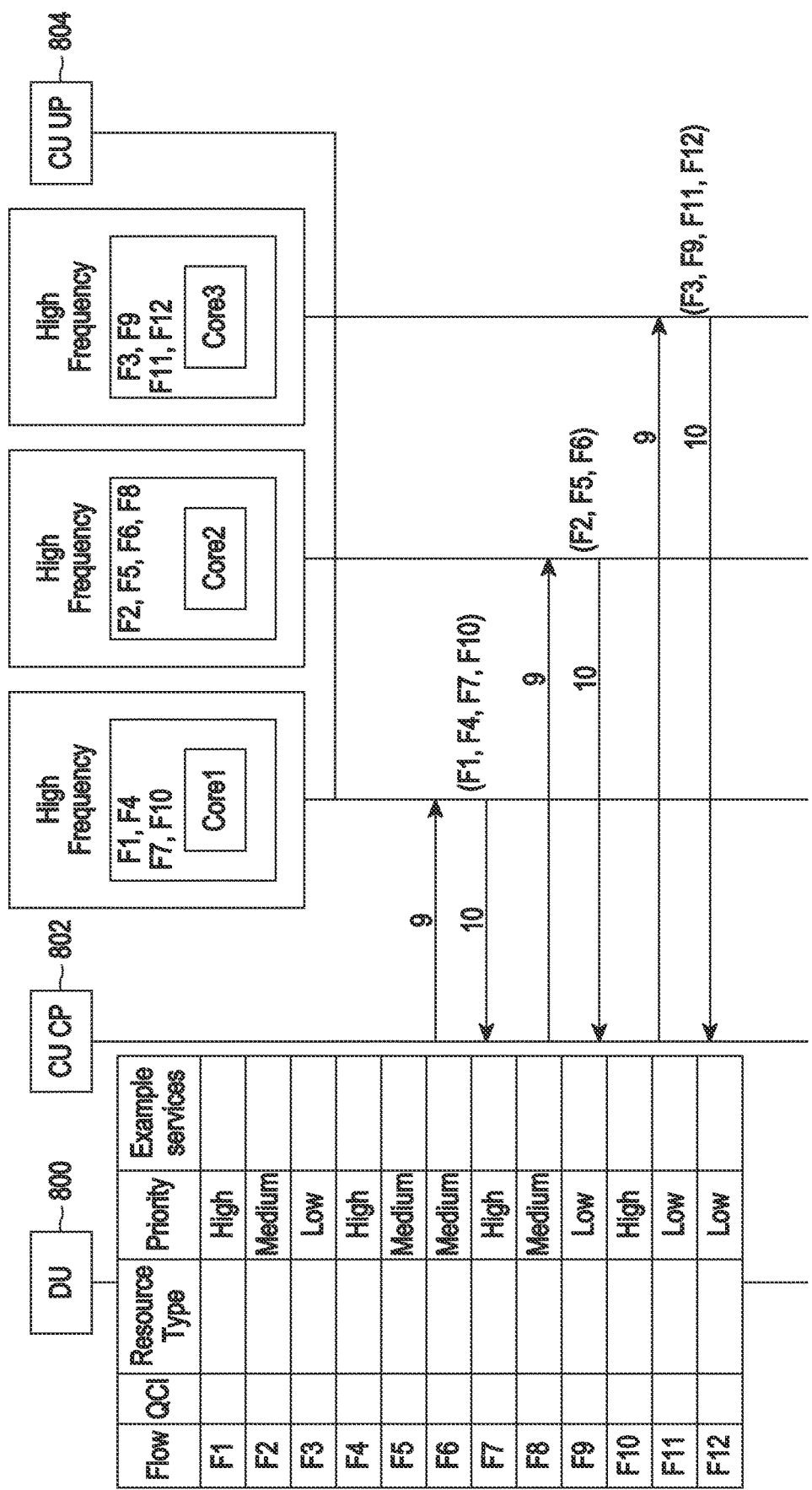
FIG. 8 illustrates a line diagram for a bearer context setup message flow during a peak power mode, according to an embodiment of the disclosure.

FIG. 8 illustrates a line diagram for a bearer context setup message flow during a peak power mode according to an embodiment of the disclosure.

FIG. 8 depicts a DU 800, the CU-CP 802, and the CU-UP 804 with reference to FIG. 4. The Bearer Context Setup Message flow between the CU-CP 802 and the CU-UP 804 via the E1 interface i.e., the E1AP bearer context setup request (9) and the E1AP bearer context setup response (10) will be used for describing the example scenario.

Figure 9:
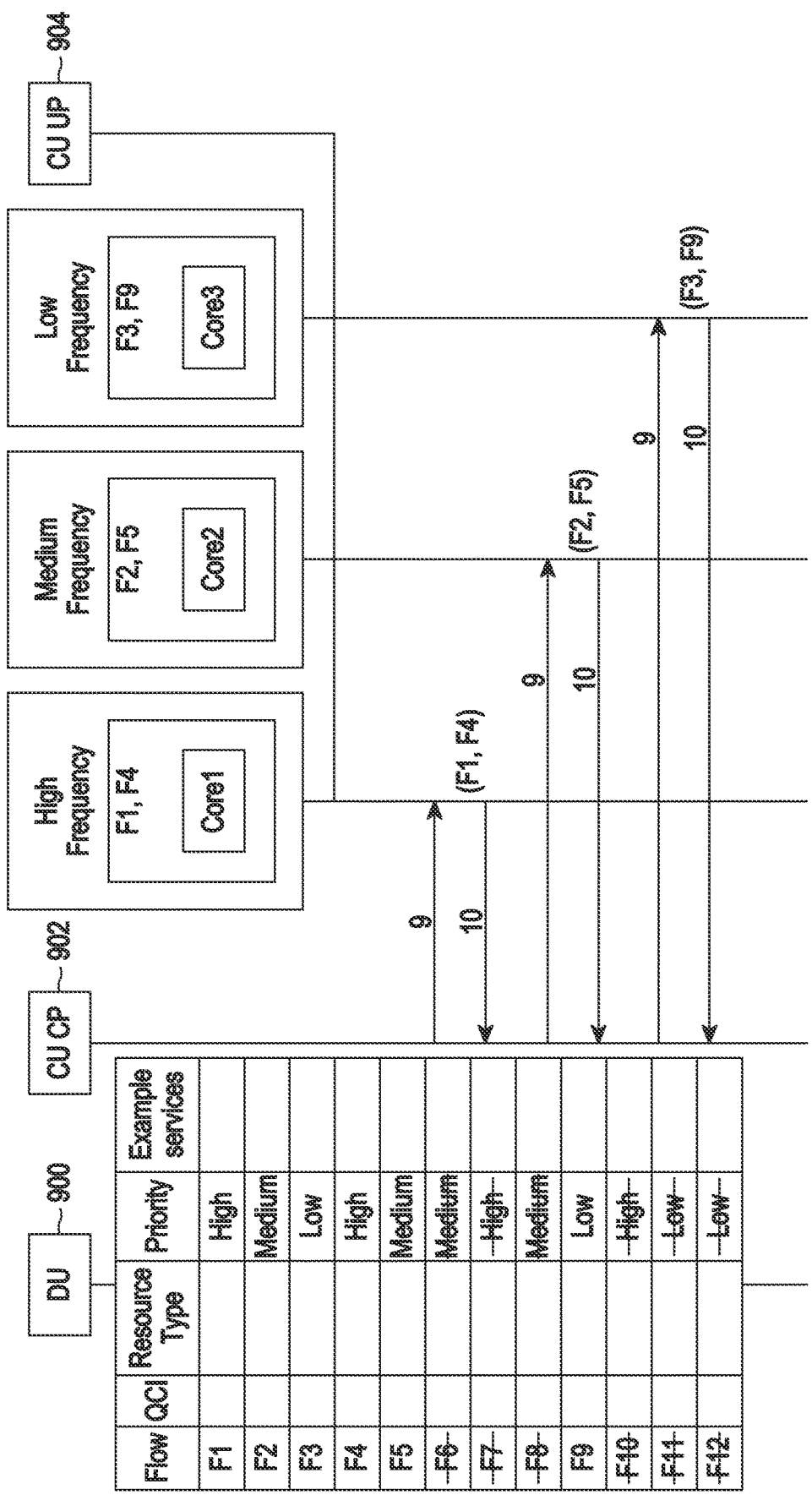
FIG. 9 illustrates a line diagram for a bearer context setup message flow during a off-peak hours or lean workload time interval, according to an embodiment of the disclosure.

FIG. 9 illustrates a line diagram for a bearer context setup message flow during off-peak hours or lean workload time interval, according to an embodiment of the disclosure.

Referring to FIG. 9, it is shown twelve flows F1 to F12 corresponding to one of the GBR or the Non-GBR each having a priority level among one of high, medium, or low. It is further shown in FIG. 8 that each of the cores (core 1, core 2, and core 3) are operating on the high frequency to process the data packets corresponding to the flows F1 through F12 even in the case that the priority level of the some of the flows are medium and low. For example, the core 1 is operating on high frequency and managing the flows F1, F4, F7, and F10 having the high priority level. The core 2 is also operating on the high frequency and managing flows F2, F5, F6, and F8 having the medium priority level, and the core 3 is also operating on the high frequency and managing flows F3, F9, F11, and F12 having the low priority level. Hence, it can be concluded that each of the CPU cores having high CPU core utilization levels even in the case of the flows having the medium priority level and the low priority level, and therefore consumes more power.

In contrast, FIG. 9 illustrates a line diagram for the bearer context setup message flow during the forecasted off-peak hours or the lean workload time interval, according to an embodiment of the disclosure. FIG. 9 depicts a DU 900, the CU-CP 902, and the CU-UP 904 with reference to FIG. 4. The bearer context setup message flow between the CU-CP 902 and the CU-UP 904 via the E1 interface i.e., the E1AP bearer context setup request (9) and the E1AP bearer context setup response (10) is used for describing the example scenario. As shown in FIG. 9, it is also shown twelve flows F1 through F12 corresponding to one of the GBR or the Non-GBR each having a priority level among one of high, medium, or low. In contrast to FIG. 8, it is further shown in FIG. 9 that each of the core 1, core 2, and core 3 are operating on different frequencies (i.e., high frequency, medium frequency, and low frequency, respectively) to process the data packets corresponding to the flows F1 through F12. Further, it is also shown in FIG. 9 that some of the flows F6, F7, F8, F10, F11, and F12 are reduced. The adjustment or scaling of the core frequencies and the optimization of the CPU cores by the user plane processing engine 321 of the VUPE 320 is the main reason behind the reduction in the flows. In contrast to the peak power mode as can be seen in FIG. 9, the core 1 is operating on the high frequency and managing only the flows F1 and F4 having the high priority level. The core 2 is operating on medium frequency and managing only the flows F2 and F5 having the medium priority level, and the core 3 is operating on the low frequency and managing only the flows F3 and F9 having the low priority level. Hence, it can be concluded from FIG. 9 that the operational frequency for the core 2 and core 3 is scaled down from the high frequency to the medium frequency and the low frequency, and hence power consumption of the CPU cores can be reduced.

Accordingly, the power efficiency for the CU-UP during the off-peak hours is improved. Therefore, according to the disclosure, the power saving mode can be enabled for the user plane (CU-UP) VNF by regulating the CPU frequency of the cores of the network server, through the AIA-UPA in the CUPS Architecture (CU, v GW).

In accordance with the above-made description regarding components of the AIA-UPA system architecture, the AIA-UPA analyzes the patterns of CPU cores utilizations based on QFI, PDB, and the throughput of each of a corresponding user plane network traffic at periodic time intervals to decide the right time to switch from default high computation to the determined operational frequency i.e., the medium frequency and the low frequency. By default, the CPU cores having the high frequency utilization level will continue to operate on the high frequency. The AIA-UPA is switched back to default high frequency mode for the required cores in accordance with the requirement of the utilization level that is predicted or forecasted using the ARIMA time series model.

Referring back again to FIG. 3, the VUPB 310 may also determine an optimal operational frequency for the CPU cores of the network server having the medium and low network resource utilization levels based on the forecasted lean workload time interval and at least one of the QCI values and the QFI values. More particularly, the operating frequency prediction module 313 determines the optimal operational frequency for a set of CPU cores among the CPU cores 322 operating on the medium and the low frequency to tune their core frequencies, based on the forecasted lean workload time interval and at least one of the QCI values and the QFI values. Further, the operating frequency prediction module 313 communicates the determined optimal operational frequency to the frequency change notification module 314 of the VUPB 310.

The frequency change notification module 314 updates the shared memory 330 with information regarding the determined optimal operational frequency. Accordingly, the user plane processing engine 321 uses the determined optimal operational frequency stored in the shared memory 330 to tune the frequencies of the CPU cores 322. More particularly, the user plane processing engine 321 allocates the determined optimal operational frequency to the CPU cores having the medium and low operating frequency.

Further, according to an embodiment of the disclosure, the energy measurement module 323 of the VUPE 320 measures a time duration during which the CPU cores 322 operates on the optimal operational frequency using data stored in the shared memory 330 by the VUPB 310 or the components of the VUPB 310. Further, the energy measurement module 323 of the VUPE 320 may be configured to compute an amount of power saved by the network server based on the measured time duration.

According to another embodiment of the disclosure, the VUPE 320 may also determines applicability of a change in the CPU core frequencies based on the forecasted lean workload time interval and adjusts the CPU core frequencies based on the determined applicability. More particularly, the User Plane Processing Engine 321 determines whether the core frequencies of the CPU core 322 can be changed based on the forecasted lean workload time interval and adjusts the core frequencies of the CPU cores based on a result of the determination.

According to another embodiment of the disclosure, the VUPB 310 may also determine whether there is a loss in the throughput of the user plane network traffic or a degradation in the latency of the user plane network traffic as a result of the adjusted CPU core frequencies and update the data stored in the shared memory 330 based on a result of the determination regarding the loss in the throughput of the user plane network traffic or a degradation in the latency of the user plane network traffic. Accordingly, the user plane processing engine 321 corrects the adjusted CPU core frequencies in a case when there is a loss in the throughput of the user plane network traffic or the degradation in the latency of the user plane network traffic using the result of the determination stored in the shared memory 330.

According to another embodiment of the disclosure, the VUPB 310 may also determine whether the change in the CPU core frequencies is frequent, or constant based on the collection of the incoming data packets at the periodic time interval. More particularly, the user plane session learning module 311 determines whether the change in the core frequencies of the CPU cores 322 is frequent or constant. Further, based on a result of the determination regarding the change in the core frequencies of the CPU cores 322, the user plane processing engine 321 may restrict the adjustment of the core frequencies of the CPU cores 322.

Now the above-mentioned processing will be described in brief with the help of a line diagram using components and elements of the system 200.

Figure 10:
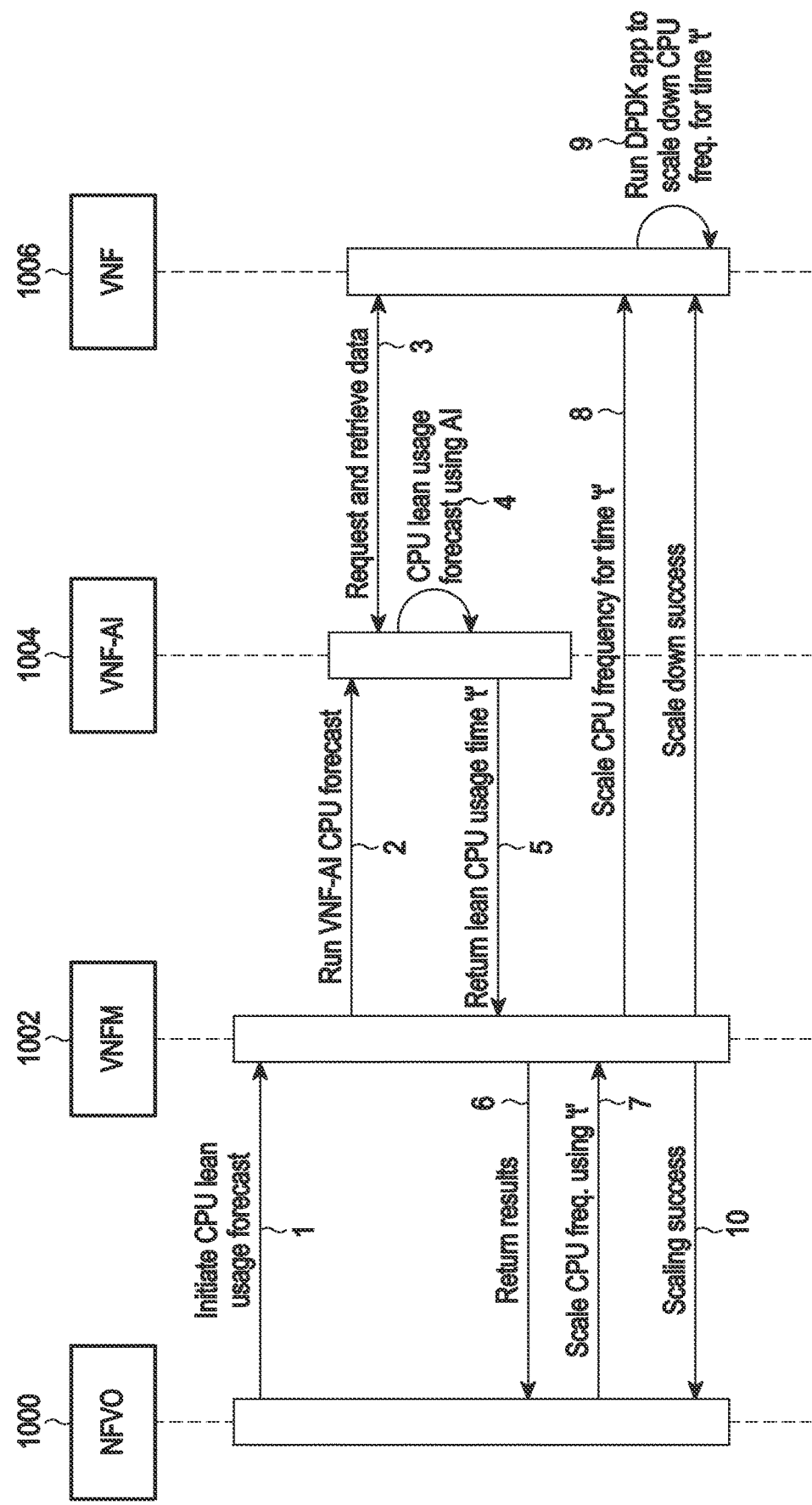
FIG. 10 illustrates a line diagram indicating flow between various components of a system in a cloud environment for dynamic frequency control according to an embodiment of the disclosure.

FIG. 10 illustrates a line diagram indicating flow between various components of a system in a cloud environment for dynamic frequency control according to an embodiment of the disclosure.

Referring to FIG. 10, it illustrates a line diagram indicating flow between various components of the system 200 in a cloud environment for dynamic frequency Control, in accordance with an embodiment of the disclosure. FIG. 10 depicts an NFVO 1000, a VNFM 1002, a VNF-AI module 1004, and a VNF 1006. Each of the NFVO 1000, the VNFM 1002, and the VNF-AI 1004 has functionalities similar to the NFVO 211, the VNFM 212, and the VNF-AI module 213 of FIG. 2, respectively.

Initially, at operation 1, the NFVO 1000 initiates the CPU lean usage forecast to the VNFM 1002. More particularly, the NFVO 1000 enables a trigger to scale the frequency of the CPU cores of the network server to enter into the power saving mode from the peak power mode. At operation 2, the VNFM 1002 runs the VNF-AI CPU forecast to forecast the AI-User Plane collection from individual VNFs in the system 200. More particularly, the VNFM 1002 enables the VNF-AI module 1004 at operation 2 to forecast the AI-User Plane collection from the individual VNFs. Furthermore, at operation 3, the VNF-AI module 1004 communicates with the VNF 1006 regarding requisition and retrieval of data.

At operation 4, the VNF-AI module 1004 forecasts lean CPU usage time 't' (lean workload period) of the CPU cores using the ARIMA time series model, and further at operation 5, sends the forecasted lean CPU usage time 't' to the VNFM 1002. Here, the VNF-AI module 1004 also forecasts the core frequencies of the CPU cores required to process the user plane network traffic based on factors like the data packet size, throughput, or the like . . . as described above. At operation 6, the VNFM 1002 returns the output results to the NFVO 1000. Further, at operation 7, the NFVO 100 scales the core frequencies of the CPU cores using the forecasted lean CPU usage time 't'. Furthermore, at operation 8, the VNFM 1002 also scales the core frequencies of the CPU cores for the forecasted lean CPU usage time 't' and sends the scaled core frequencies of the CPU cores to the VNF 1006. Further, at operation 9, the VNF 1006 runs the DPDK application to scale down the core frequencies of the CPU cores for forecasted time 't'. At last, VNF 1006 sends the scale down success notification to the VNFM 1002 and that is further transmitted to the NFVO 1000 via the VNFM 1002.

Now, a flowchart of method operations will be described with reference to FIG. 11.

Figure 11:
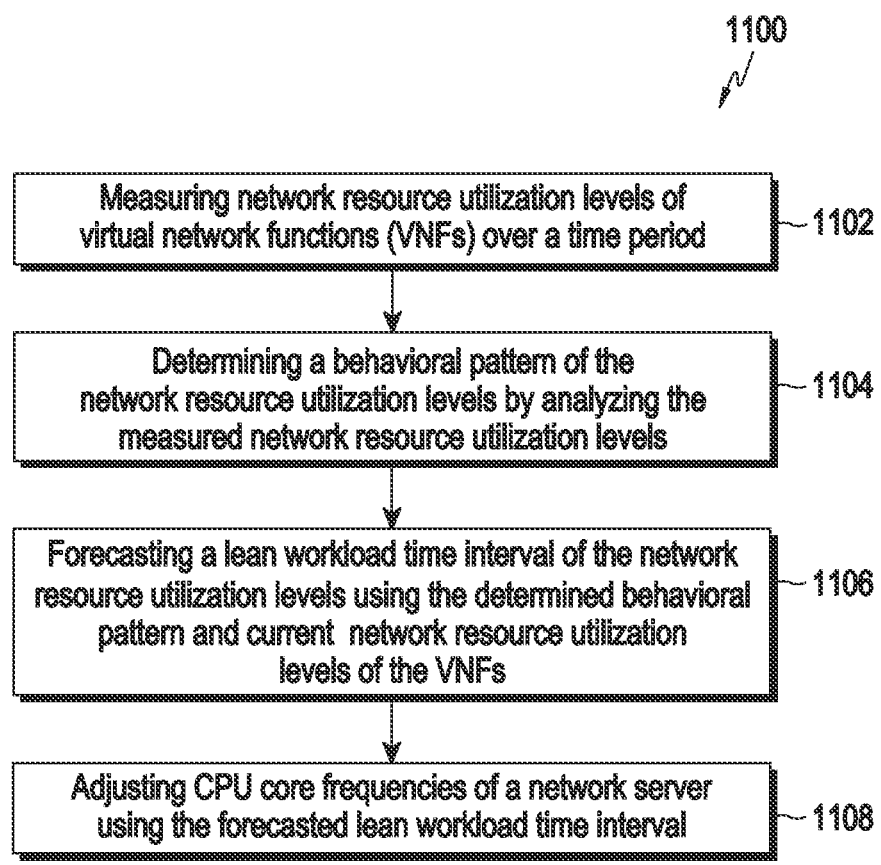
FIG. 11 illustrates a flowchart of method operations for a power management with dynamic frequency control, according to an embodiment of the disclosure.

FIG. 11 illustrates a flowchart of method operations for a power management with dynamic frequency control, according to an embodiment of the disclosure.

Referring to FIG. 11, it illustrates a flowchart of method operations for the power management with dynamic frequency Control, in accordance with an embodiment of the disclosure. FIG. 11 illustrates a method 1100 for the power management with dynamic frequency control using AI the AIA-UPA system architecture of FIG. 3. The method 1100 is also applicable to the system 200 of FIG. 2.

The method 1100 comprises measuring (at operation 1102) network resource utilization levels of the VNFs over a time period based on at least one network parameter from a plurality of network parameters. As an example, the user plane session learning module 311 of the VUPB 310 measures the network resource utilization levels of the VNFs over the time period based on the information of the data packets stored in the shared memory 330. The flow of the method 1100 now proceeds to (operation 1104).

At the operation 1104, subsequent to the measurement of network resource utilization levels of the VNFs, the method 1100 comprises determining the behavioral pattern of the network resource utilization levels based on the predictive analysis of the measured network resource utilization levels. As an example, the user plane session learning module 311 analyses the measured network resource utilization levels stored in the user plane sessions database 312 using the ARIMA time series model and determines the behavioral pattern of the network resource utilization levels based on the result of the analysis. The flow of the method 1100 now proceeds to (operation 1106).

At the operation 1106, subsequent to the determination of the behavioral pattern of the network resource utilization levels, the method 1100 comprises forecasting the lean workload time interval of the network resource utilization levels based on the determined behavioral pattern and current network resource utilization levels of the VNFs. As an example, the user plane session learning module 311 of the VUPB forecasts the lean workload time interval of the CPU cores 322 based on the determined behavioral pattern and current CPU core utilization levels of the CPU cores 322. The flow of the method 1100 now proceeds to (operation 1108).

At the operation 1108, subsequent to the forecast of the lean workload time interval, the method 1100 comprises adjusting the core frequencies of the CPU cores of the network server based on the forecasted lean workload time interval. As an example, the user plane processing engine 321 of the VUPE 320 adjusts the core frequencies of the CPU cores 322 based on the forecasted lean workload time interval such that the CPU cores 322 starts operating in the power saving mode. More particularly, at the operation 1108, the user plane processing engine 321 changes the operational frequency of the CPU cores 322 in accordance with the forecasted lean workload time interval.

Figure 12:
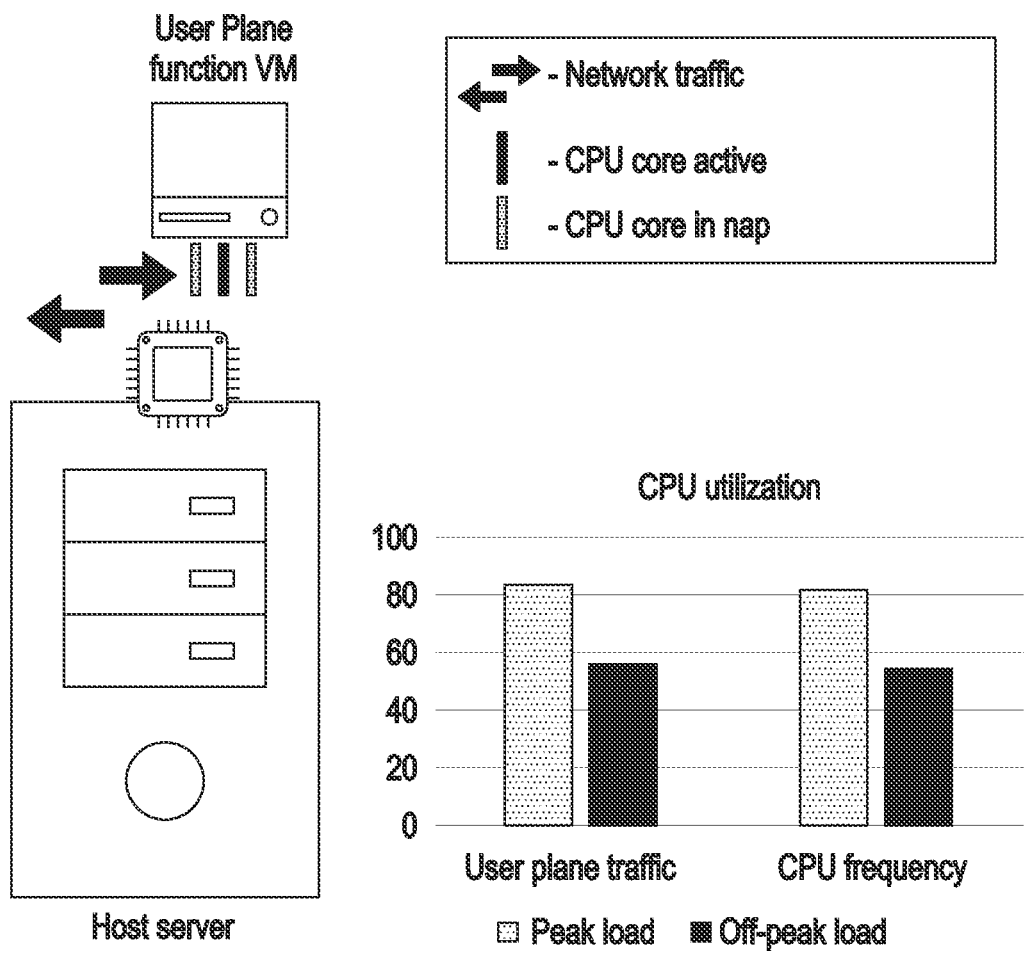
FIG. 12 illustrates an advantage of a AI-based power management method with dynamic frequency control of the disclosure over the related art according to an embodiment of the disclosure.

FIG. 12 illustrates an advantage of a AI-based power management method with dynamic frequency control of the disclosure over the related art according to an embodiment of the disclosure.

Referring to FIG. 12, it illustrates an example to show the advantage of the AI-based power management method with dynamic frequency control of the disclosure over the existing related art, according to an embodiment of the disclosure. As can be seen from FIG. 12, the off-peak load of the CPU is reduced in contrast to the existing art as shown in FIG. 1 of the Drawings. The optimization of the operational frequency of the CPU cores as proposed in the disclosure is the reason behind the reduction in the off-peak load of the CPU. According to the proposed systems and methods of the disclosure, only some of the CPU cores operate at the high frequency, and the rest of the CPU cores operates on the optimized operational frequency to reduce the power of the network server during the off-peak times.

Figure 13:
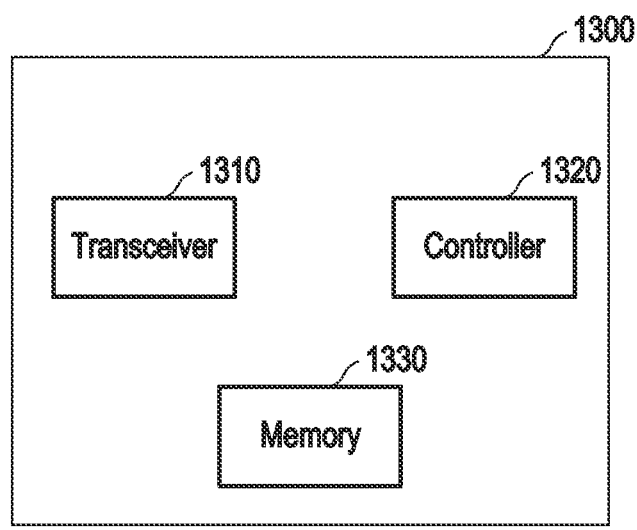
FIG. 13 illustrates an electronic device according to an embodiment of the disclosure.

FIG. 13 illustrates an electronic device according to an embodiment of the disclosure.

Referring to FIG. 13, it illustrates an electronic device according to an embodiment of the disclosure. Referring to FIG. 13, an electronic device 1300 may correspond to the network server or the electronic device 1300 may be an apparatus implemented as a part of the network server. In some embodiment, the electronic device 1300 is an apparatus separated from the network server, and communicating with the network server. The system 300 described in FIG. 3 and may be implemented in the electronic device 1300. The system 200 described in FIG. 2 and may be implemented in the electronic device 1300. The method 1100 described in FIG. 1100 may be performed by the electronic device 1300.

The electronic device 1300 may comprise a transceiver 1310, a controller 1320, and a memory 1330.

The transceiver 810 may be configured to transmit or receive a signal or data to or from a different device via a cable or wirelessly. The transceiver 810 may perform communication using various communication methods, such as known Wi-Fi, LTE, LTE-A, CDMA, orthogonal frequency division multiplexing (OFDM), and coded OFDM (COFDM), but communication methods available for the transceiver 810 are not necessarily limited thereto.

The controller 1320 may be connected to the transceiver 1310. The controller 1320 may include at least one processor. The controller 1320 may control overall operations of the electronic device 1300, and thus an operation of the electronic device 1300 may be construed as an operation of the controller 1320. The modules described in this specification may be implemented by the controller performing instructions related to the modules stored in the memory 1300.

The memory 1330 may be connected to the controller 1320. The memory 1330 may store pieces of temporary or permanent information necessary for an operation of the controller 1320. The memory 1330 is executable by the controller 820 and may include commands or instructions to drive the controller 1320.

The proposed system and methods of the disclosure help in reducing the CPU cycle frequencies during off-peak loads which in turn helps to reduce the power utilization of the AUPF. Further, the proposed system and methods of the disclosure also contribute to the addition of a new power saving feature to save power in large data centers that are surging due to the heavy network traffic.

The proposed system and methods of the disclosure can also help in reducing the operational expenses in terms of power for the network operators while ensuring that the throughput and latency of the applications are not affected.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the claims and their equivalents.

What is claimed is:

1. A method for power management in a wireless communication system, the method comprising:
   measuring network resource utilization levels for a plurality of virtual network functions (VNFs) over a time period based on at least one network parameter;
   determining a behavioral pattern of the network resource utilization levels based on a predictive analysis of the measured network resource utilization levels;
   forecasting a lean workload time interval of the network resource utilization levels based on the determined behavioral pattern and current network resource utilization levels of the plurality of VNFs; and
   adjusting central processing unit (CPU) core frequencies of a network server based on the forecasted lean workload time interval.

2. The method of claim 1,
wherein, for forecasting the lean workload time interval, the method further comprises:
forecasting a threshold usage limit for CPU cores of the network servers using an auto regressive integrated moving average (ARIMA) model; and
forecasting the lean workload time interval when the CPU cores usage reaches to a point that is less than the forecasted threshold usage limit, and
wherein the network resource utilization levels include information related to at least one of a CPU core utilization level, inter-arrival of data packets, sizes of data packets, a type of user plane network traffic, quality-of-service class identifiers (QCI) values associated with the data packets, and quality-of-service flow ID (QFI) values associated with the data packets.

3. The method of claim 2,
wherein the CPU core utilization level indicates a frequency level among a plurality of frequency levels, and
wherein the adjustment of the CPU core frequencies indicates a change in the CPU core frequencies from a first frequency level of the plurality of frequency levels to one of a second frequency level of the plurality of frequency levels or a third frequency level of the plurality of frequency levels.

4. The method of claim 1, wherein the forecasting of the lean workload time interval comprises:
collecting, at an instance of time, data packets associated with user plane data radio bearers (DRB) sessions including time stamp, wherein each of the data packets includes information associated with one of quality-of-service class identifiers (QCI) values or quality-of-service flow ID (QFI) values, a packet delay budget of a user plane network traffic, a throughput of the user plane network traffic, a flow priority level, and a latency of the user plane network traffic;
storing the collected data packets in a local database associated with the network server and the measured network resource utilization levels as historical data in a user plane session database;
determining priority levels of the data packets based on a class of the at least one of the QCI values and the QFI values included in the data packets;
determining a level of the network traffic based on the information associated with the packet delay budget, the throughput, the flow priority level, and the latency included in the data packets; and
training an auto regressive integrated moving average (ARIMA) model based the determined priority level, the historical data, and the determined level of the network traffic.

5. The method of claim 4, further comprising:
managing a processing flow of the data packets based on the determined priority levels of the data packets;
determining the behavioral pattern of the network resource utilization levels based on the processing flow of the data packets; and
forecasting the lean workload time interval based on the processing flow of the data packets.

6. The method of claim 4, further comprising:
determining, at a specific time interval, the data packets having high priority levels and a requirement of high throughput of user plane DRB sessions; and
switching, based on the determined data packets having the high priority levels and the requirement of the high throughput of the user plane DRB sessions, the CPU core frequencies from one of second frequency level or a third frequency level to a first frequency level, such that the network server enters into a peak power mode from a power saving mode.

7. The method of claim 4, further comprising:
determining, based on the forecasted lean workload time interval and at least one of the QCI values and the QFI values, an optimal operational frequency for CPU cores of the network server having medium and low network resource utilization levels;
allocating the determined optimal operational frequency to the CPU cores having the medium and the low network resource utilization levels;
measuring a time duration during which the CPU cores operates on the optimal operational frequency; and
computing an amount of power saved by the network server based on the measured time duration.

8. The method of claim 4, further comprising:
determining an applicability of a change in the CPU core frequencies based on the forecasted lean workload time interval;
adjusting the CPU core frequencies based on the determined applicability such that the network server enters to a power saving mode from a peak power mode;
determining at least one of a loss in the throughput of the user plane network traffic or a degradation in the latency of the user plane network traffic as a result of the adjusted CPU core frequencies; and
correcting the adjusted CPU core frequencies based on the at least one of the loss in the throughput of the user plane network traffic or the degradation in the latency of the user plane network traffic.

9. The method of claim 8, further comprising:
collecting the data packets at a periodic time interval;
determining whether the change in the CPU core frequencies is frequent or constant based on the collection of the data packets at the periodic time interval; and
restrict the adjustment of the CPU core frequencies based on one of the determination of the change in the CPU core frequencies is frequent or the determination of the change in the CPU core frequencies is constant.

10. The method of claim 1, further comprising optimizing CPU cores of the network server based on the adjusted CPU core frequencies such that power consumption of the network server is reduced while maintaining an optimal data traffic rate.

11. The method of claim 10, wherein the optimization of the CPU cores comprising:
classifying a plurality of sets of CPU cores of the network server based on a current data traffic rate and the adjusted CPU core frequencies; and
allocating, based on the classified plurality of sets of CPU cores, a first frequency to a first set of CPU cores among the plurality of sets of CPU cores having a high CPU core utilization level, a second frequency to a second set of CPU cores among the plurality of sets of CPU cores having a medium CPU core utilization level, and a third frequency to a third set of CPU cores having a low CPU core utilization level, respectively.

12. The method of claim 4,
wherein the at least one network parameters corresponds to at least one of a specific time of a day, a density of the network traffic, and a specific weather condition,
wherein the forecasted lean workload time interval indicates an off-peak time interval at which the network resource utilization levels are less than a specific optimal resource utilization threshold value of the plurality of VNFs, and wherein the off-peak time interval is a time interval at which CPU cores utilization level of the network server is less in comparison to a peak time interval.

13. The method of claim 1,
wherein the adjustment of the CPU core frequencies corresponds to scaling of the CPU core frequencies, and
wherein the scaling of the CPU core frequencies is performed by toggling frequency of CPU cores of the network server having one of medium network resource utilization levels or low network resource utilization levels.

14. An apparatus for power management in a wireless communication system, the apparatus comprising:
a transceiver;
memory storing instructions; and
at least one processor coupled to the transceiver and the memory,
wherein the instructions, when executed by the at least one processor, cause the apparatus to perform operations comprising:
measuring network resource utilization levels for a plurality of virtual network functions (VNFs) over a time period based on at least one network parameter,
determining a behavioral pattern of the network resource utilization levels based on a predictive analysis of the measured network resource utilization levels,
forecasting a lean workload time interval of the network resource utilization levels based on the determined behavioral pattern and current network resource utilization levels of the plurality of VNFs, and
adjusting CPU core frequencies of a network server based on the forecasted lean workload time interval.

15. The apparatus of claim 14,
wherein the forecasting of the lean workload time interval comprises:
forecasting a threshold usage limit for CPU cores of the network servers using an auto regressive integrated moving average (ARIMA) model, and
forecasting the lean workload time interval when the CPU cores usage reaches to a point that is less than the forecasted threshold usage limit, and
wherein the network resource utilization levels include information related to at least one of a central processing unit (CPU) core utilization level, inter-arrival of data packets, sizes of data packets, a type of user plane network traffic, quality-of-service class identifiers (QCI) values associated with the data packets, and quality-of-service flow ID (QFI) values associated with the data packets.

16. The apparatus of claim 14, wherein the forecasting of the lean workload time interval comprises:
collecting, at an instance of time, data packets associated with user plane data radio bearers (DRB) sessions including time stamp, wherein each of the data packets includes information associated with one of quality-of-service class identifiers (QCI) values or quality-of-service flow ID (QFI) values, a packet delay budget of a user plane network traffic, a throughput of the user plane network traffic, a flow priority level, and a latency of the user plane network traffic,
storing the collected data packets in a local database associated with the network server and the measured network resource utilization levels as historical data in a user plane session database,
determining priority levels of the data packets based on a class of the at least one of the QCI values and the QFI values included in the data packets,
determining a level of the network traffic based on the information associated with the packet delay budget, the throughput, the flow priority level, and the latency included in the data packets, and
training an auto regressive integrated moving average (ARIMA) model based the determined priority level, the historical data, and the determined level of the network traffic.

17. The apparatus of claim 14, wherein the operations further comprises optimizing CPU cores of the network server based on the adjusted CPU core frequencies such that power consumption of the network server is reduced while maintaining an optimal data traffic rate.

18. The apparatus of claim 17, wherein the optimizing of the CPU cores comprises:
classifying a plurality of sets of CPU cores of the network server based on a current data traffic rate and the adjusted CPU core frequencies, and
allocating, based on the classified plurality of sets of CPU cores, a first frequency to a first set of CPU cores among the plurality of sets of CPU cores having a high CPU core utilization level, a second frequency to a second set of CPU cores among the plurality of sets of CPU cores having a medium CPU core utilization level, and a third frequency to a third set of CPU cores having a low CPU core utilization level, respectively.

19. The apparatus of claim 16,
wherein the at least one network parameters corresponds to at least one of a specific time of a day, a density of the network traffic, and a specific weather condition,
wherein the forecasted lean workload time interval indicates an off-peak time interval at which the network resource utilization levels are less than a specific optimal resource utilization threshold value of the plurality of VNFs, and
wherein the off-peak time interval is a time interval at which CPU cores utilization level of the network server is less in comparison to a peak time interval.

20. The apparatus of claim 14,
wherein the adjustment of the CPU core frequencies corresponds to scaling of the CPU core frequencies, and
wherein the scaling of the CPU core frequencies is performed by toggling frequency of CPU cores of the network server having one of medium network resource utilization levels or low network resource utilization levels.

* * * * *